United States Patent
Torralba et al.

(10) Patent No.: US 11,696,626 B2
(45) Date of Patent: Jul. 11, 2023

(54) SUPPORT SYSTEM FOR AN ATMOSPHERIC SUIT

(71) Applicant: Hamilton Sundstrand Corporation, Charlotte, NC (US)

(72) Inventors: Monica Torralba, Antioch, CA (US); Ashley Rose Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 4 days.

(21) Appl. No.: 17/517,127

(22) Filed: Nov. 2, 2021

(65) Prior Publication Data
US 2023/0137054 A1    May 4, 2023

(51) Int. Cl.
| *A45B 1/04* | (2006.01) |
| *B64G 6/00* | (2006.01) |
| *A45B 9/02* | (2006.01) |
| *A45B 9/04* | (2006.01) |
| *A45B 9/00* | (2006.01) |

(52) U.S. Cl.
CPC .................. *A45B 1/04* (2013.01); *A45B 9/02* (2013.01); *B64G 6/00* (2013.01); *A45B 9/04* (2013.01); *A45B 2009/007* (2013.01); *A45B 2009/025* (2013.01)

(58) Field of Classification Search
CPC ..................................... A45B 1/04; B64G 6/00
See application file for complete search history.

(56) References Cited

U.S. PATENT DOCUMENTS

| 3,130,413 | A | | 4/1964 | Schueller |
| 3,139,622 | A | * | 7/1964 | Schueller ................ B64G 6/00 2/2.12 |
| 4,887,749 | A | | 12/1989 | Kosmo et al. |
| 6,000,414 | A | * | 12/1999 | Crusor ..................... A45B 1/04 224/904 |
| 6,217,072 | B1 | * | 4/2001 | Gregg ....................... A45B 1/04 224/267 |
| 2019/0343250 | A1 | | 11/2019 | Rau et al. |

FOREIGN PATENT DOCUMENTS

| CN | 108725848 B | 11/2018 |
| RU | 2248917 C1 | 3/2005 |
| RU | 2708133 C1 | 12/2019 |

OTHER PUBLICATIONS

European Search Report for Application No. 22204686.4 dated Mar. 22, 2023, 21 pp.

* cited by examiner

*Primary Examiner* — Noah Chandler Hawk
(74) *Attorney, Agent, or Firm* — Cantor Colburn LLP (57) ABSTRACT

A system for support of a user includes an atmospheric suit including a removable support structure, the support structure including a set of poles configured to be engaged with the atmospheric suit in a space environment, wherein each pole of the set of poles includes an attachment device, the attachment device configured to removably attach the pole to the atmospheric suit at a plurality of locations on the atmospheric suit.

20 Claims, 7 Drawing Sheets

SUPPORT SYSTEM FOR AN ATMOSPHERIC SUIT

BACKGROUND

Exemplary embodiments pertain to the art of space exploration and, in particular, to a support system for an atmospheric suit.

Atmospheric suits provide a habitable environment for the wearer. For example, a space suit provides a habitable environment for an astronaut during space exploration, such as for an astronaut in an extraterrestrial environment (e.g., outside of a space craft or on the surface of a celestial body). One type of atmospheric suit is referred to as an extravehicular mobility unit (EMU), which can be used, for example, in orbit or on the surface of a celestial body such as the moon or a planet. Various challenges can arise when exploring a surface. For example, atmospheric suits can restrict mobility and make it difficult to bend, sit, pick up objects and/or perform other movements. In addition, uneven terrain can contribute to mobility challenges.

BRIEF DESCRIPTION

According to an embodiment, a system for support of a user includes an atmospheric suit including a removable support structure, the support structure including a set of poles configured to be engaged with the atmospheric suit in a space environment, wherein each pole of the set of poles includes an attachment device, the attachment device configured to removably attach the pole to the atmospheric suit at a plurality of locations on the atmospheric suit.

In addition to one or more of the features described herein, or as an alternative, the plurality of locations includes a first location at one of a glove portion and an arm portion of the atmospheric suit, and a second location that is different than the first location.

In addition to one or more of the features described herein, or as an alternative, the set of poles are configured to provide support to the user, and the attachment device permits the user to control each pole, when each pole is attached to the atmospheric suit at the first location.

In addition to one or more of the features described herein, or as an alternative, the attachment device is configured to permit unobstructed movement of the atmospheric suit when each pole is attached to the atmospheric suit at the second location.

In addition to one or more of the features described herein, or as an alternative, the attachment device includes an attachment mechanism, the attachment mechanism is a handle strap, a mechanical attachment mechanism, a snap-on attachment mechanism, a clasp or a magnetic attachment mechanism.

In addition to one or more of the features described herein, or as an alternative, each pole is extendable and retractable between a plurality of positions, the plurality of positions including an extended position and a retracted position.

In addition to one or more of the features described herein, or as an alternative, the attachment device is disposed at a location of the pole proximate to a handle of the pole.

In addition to one or more of the features described herein, or as an alternative, at least one pole of the set of poles includes a pole attachment configured to removably attach the set of poles together.

2

In addition to one or more of the features described herein, or as an alternative, each pole of the set of poles includes a ground interface at an end of each pole.

In addition to one or more of the features described herein, or as an alternative, the system includes a plurality of interchangeable ground interface attachments, each ground interface attachment removably attachable to the ground interface.

In addition to one or more of the features described herein, or as an alternative, the attachment device is a first attachment device included in each pole of the set of poles, the first attachment device configured to be removably attached to first location at one of a glove portion and an arm portion of the atmospheric suit, and at least one pole of the set of poles includes a second attachment device configured to removably attach the pole to the atmospheric suit at a second location that is different than the first location.

In addition to one or more of the features described herein, or as an alternative, each pole is extendable and retractable between a plurality of positions, the plurality of positions including an extended position and a retracted position.

In addition to one or more of the features described herein, or as an alternative, the first attachment device is configured to be removably attached to the first location when each pole is in the extended position, and the second attachment device is configured to be removably attached at the second location when each pole is in the retracted position.

According to an embodiment, a method of supporting a user in an atmospheric suit includes engaging a set of poles with the atmospheric suit in a space environment, wherein each pole of the set of poles includes an attachment device, the attachment device configured to removably attach the pole to the atmospheric suit at a plurality of locations on the atmospheric suit.

In addition to one or more of the features described herein, or as an alternative, the plurality of locations includes a first location at one of a glove portion and an arm portion of the atmospheric suit, and a second location that is different than the first location.

In addition to one or more of the features described herein, or as an alternative, engaging the set of poles includes removably attaching each pole at the first location, providing support to the user by the set of poles, and permitting the user to control each pole.

In addition to one or more of the features described herein, or as an alternative, engaging the set of poles includes removably attaching the set of poles at the second location to permit unobstructed movement of the atmospheric suit.

In addition to one or more of the features described herein, or as an alternative, the attachment device includes an attachment mechanism selected from at least one of: a handle strap, a mechanical attachment mechanism, a snap-on attachment mechanism, a clasp and a magnetic attachment mechanism.

In addition to one or more of the features described herein, or as an alternative, each pole is extendable and retractable between a plurality of positions, the plurality of positions including an extended position and a retracted position.

In addition to one or more of the features described herein, or as an alternative, at least one pole of the set of poles includes a pole attachment configured to removably attach the set of poles together.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Systems and methods are provided for supporting and assisting a user (e.g., astronaut) of an atmospheric suit (e.g., EMU). An embodiment of a support system includes a single or set of poles configured to be removably attached to an atmospheric suit. The set of poles is designed to provide improved stability, load distribution, and reduced user fatigue for varying space environments and other environments for which an atmospheric suit is desired. The support system can also enhance mobility by providing support to the user and facilitating activities such as manipulating objects.

An embodiment of the support system includes an attachment device disposed at each pole. The attachment device may be used to removably attach each pole to one of a plurality of suit locations. In an embodiment, the attachment device can engage a first location (e.g., at or near a glove or arm portion of the suit), such that the user is able to control the poles and use the poles to support the user and facilitate various activities (e.g., extravehicular exploration of the surface of a celestial body). The attachment device can also engage a second location (e.g., a belt, a leg portion of the suit, a suit life support system, etc.) for storage of the poles when not in use. The attachment device may engage preexisting features of the suit, or the support system may include one or more removable suit connection components that engage with the attachment device.

The poles may each include a telescoping mechanism or other feature to allow the poles to be moveable between various positions in order to extend or reduce the length of the poles. The poles may each include a ground interface that removably attaches to one of a plurality of ground interface attachments. The attachments are interchangeable so that the poles can be configured for different purposes (e.g., walking on various types of terrain, collecting samples, moving debris, etc.)

At least some embodiments described herein present a number of advantages and technical effects. The support system improves stability and reduces fatigue while also offering simple manufacturing and maintenance, as well as an intuitive design that requires minimal training, and multi-purpose use. In addition, the inclusion of various ground interface attachments allows the poles to be customized based on terrain for use to optimize stability, positioning, and object management. The poles can also attach and/or fold together in a way that allows for a temporary table or seating.

Embodiments detailed herein relate to support systems for an atmospheric suit. While an EMU and a space application are illustrated and discussed, in particular, for explanatory purposes, the components that are shown and discussed may also be applicable in underwater (e.g., in an atmospheric diving suit), earth-based (e.g., in a hazmat suit or contamination suit), high-altitude (e.g., in a flight suit), and subsurface applications. Generally, a suit that includes a helmet and is supplied with oxygen to maintain a habitable environment is referred to as an atmospheric suit. The support systems described herein, according to one or more embodiments, may be used to provide support to a user of an atmospheric suit in any of these environments.

Figure 1:
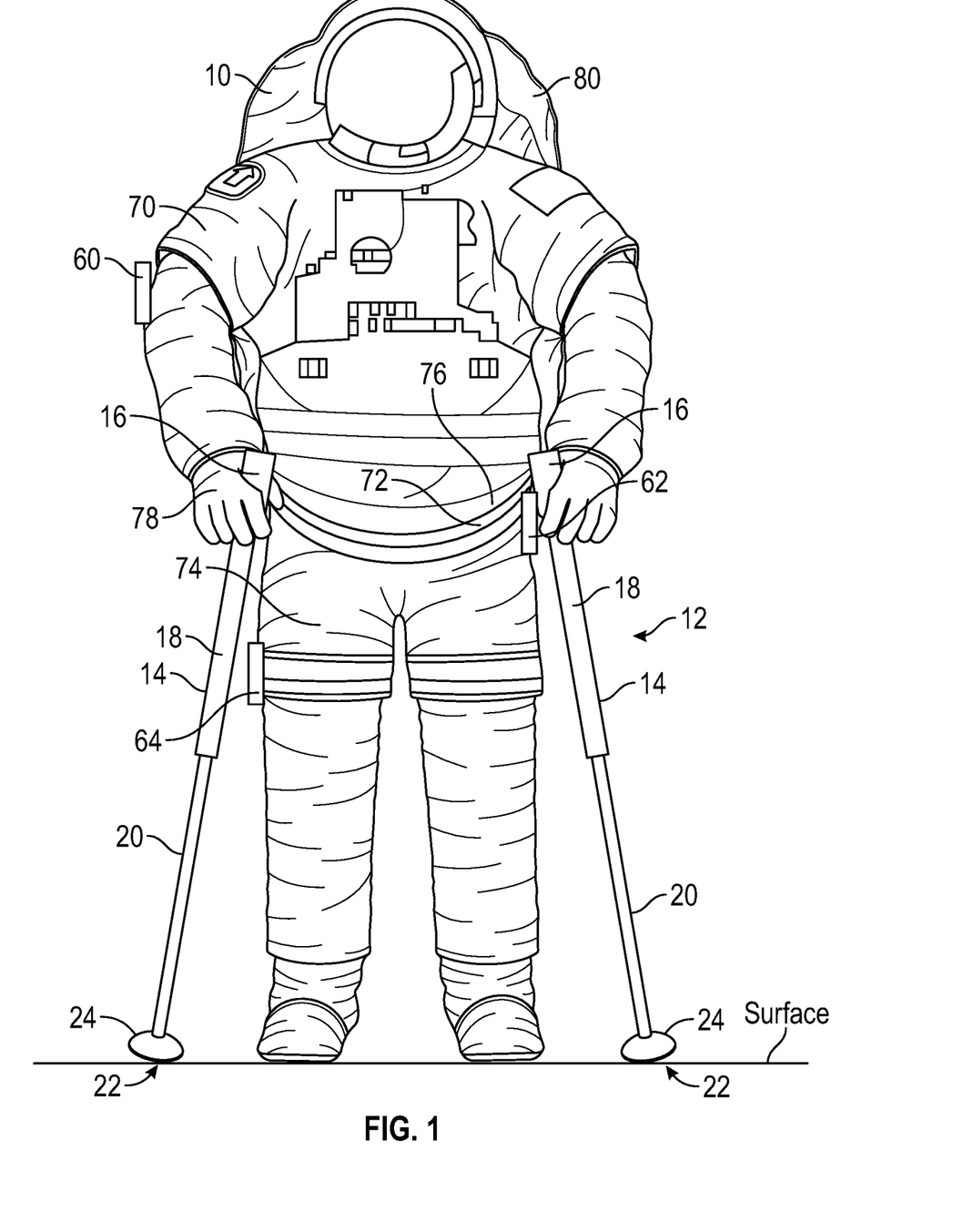
FIG. 1 depicts a user in an atmospheric suit, and depicts an embodiment of a support system including a set of poles.

FIG. 1 depicts an example of a user (e.g., an astronaut) in an atmospheric suit 10 with a support system 12 according to one or more embodiments. The atmospheric suit 10 in this example is an extravehicular mobility unit (EMU) designed for use in space environments, such as during extravehicular activities on the surface of the moon or other celestial body. As noted above, the support system is not limited to use with any specific type of atmospheric suit or environment.

The support system 12 is configured to support a user while standing, walking, or sitting, and serves as a platform for other uses (e.g., sampling, manipulation of objects, etc.). The support system 12 provides a wide variety of uses which include but are not limited to stabilizing, positioning, and grabbing for a multitude of activities and environments. For example, the support system 12 can be used to support the user while walking, help the user to transition from standing to sitting, and/or assist the user in getting up from a fall.

The support system 12 includes a set of poles 14, each of which may be extendable and retractable between a retracted position (shown in FIGS. 6 and 8) and an extended position as shown in FIG. 1. The set of poles 14 may be made from any desired material, such as stainless steel, titanium, or high strength polymer materials. Each pole 14 includes a handle 16, a first elongated member 18, and at least one telescoping member 20. Each pole 14 may include an automatic extension mechanism, such as a spring or hydraulic device, which can be actuated (e.g., by a trigger or other actuator at or near the handle 16) by a user to extend or retract the pole 14 by extending or retracting the telescoping member(s) 20.

The poles 14 can be extended and retracted according to any suitable mechanism. For example, each pole 14 can have any number of telescoping members (e.g., two or more telescoping members 20 that collapse into one another).

FIG. 1 shows the set of poles 14 in the extended position, in which each pole has a length such that the user can use the set of poles for additional support when walking or during other activities. For example, the extended length is selected so that a user can engage the surface on which the user is walking via a removable attachment to the handle 16. The removable attachment may be accomplished via, for example, a suit interface 30 or 32 (shown in FIGS. 3, 4 and 6-9), or via the user grabbing or grasping the handle 16.

In an embodiment, each pole 14 includes a ground interface 22 that may be removably attached to the end of the telescoping member 20 to facilitate engagement with the surface to help support the user. The ground interface 22 may be configured for various terrains and for other functions, such as collecting samples. In an embodiment, the ground interface 22 interchangeably engages each of a plurality of removably attachable components or attachments 24.

The attachments 24 may be modular and interchangeable to allow a user to switch between attachments 24 as desired. For example, a user can use an attachment 24 configured to facilitate support when walking, such as a wide attachment (e.g., a disc) that is wider than the telescoping member 20, and later switch to an attachment 24 configured to assist in collecting samples or object management (e.g., manipulating rocks and debris), such as a claw and/or magnetic structure.

Figure 2:
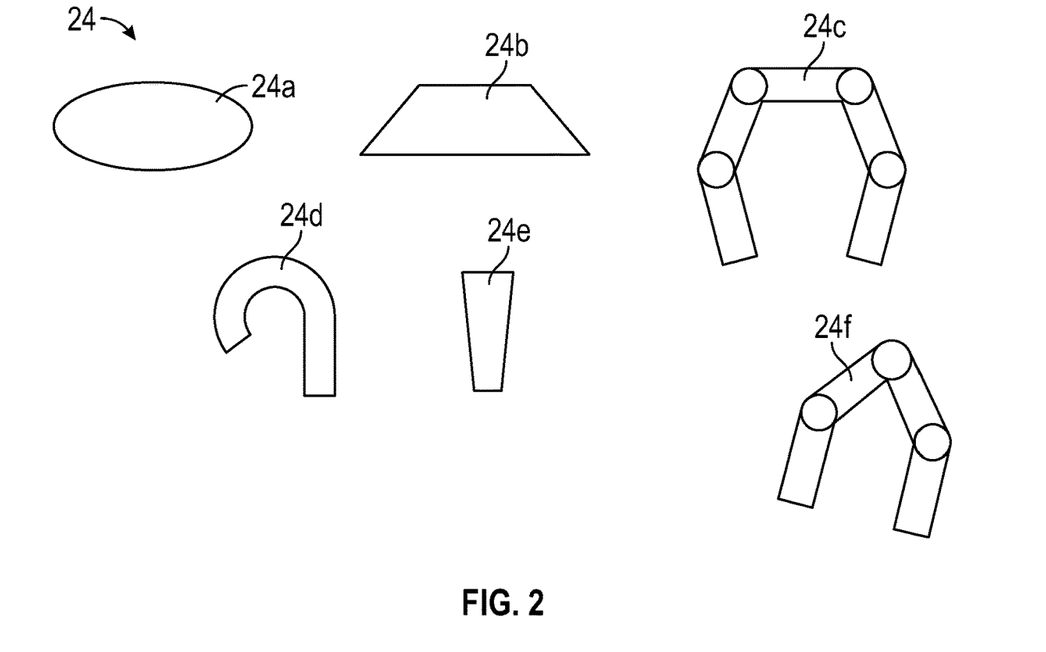
FIG. 2 depicts examples of attachments for a ground interface of each of the set of poles of FIG. 1.

FIG. 2 depicts examples of attachments 24a-24f that may form part of the ground interface 22. An attachment 24a is a disk shaped attachment that provides a relatively wide surface for engagement with the ground. An attachment 24b is a conical cylinder shaped body. Attachment 24d is a hook-shaped body and attachment 24e is a blunt spike. Attachments 24c and 24f are versions of a movable claw or clamp. Attachments 24 that can be used with the ground interface 22 are not limited to these examples, and may have any suitable shape, size or structure. One or more of the attachments 24a-24f may be magnetic or include magnets to facilitate, for example, grabbing and holding objects.

An attachment 24 may be a static body or have moveable features. For example, the attachment may be a clamp, claw or other structure that can be controlled to open and close. An attachment may include additional features, such as a perforated or textured surface, surface coatings, magnets and others.

One or more of the poles 14 includes a suit interface (e.g., a suit interface 30 shown in FIGS. 3, 4 and 6-8, and/or a suit interface 32 shown in FIGS. 7 and 8), which is or includes an attachment device that allows the pole 14 to be removably attached to the suit at a desired location. For example, each pole 14 can have an attachment device that engages the suit 10 at one location or a plurality of locations. Examples of locations (see FIG. 1) include an arm portion 70, a waist area 72, a leg portion 74, a belt 76, and a glove portion 78. Other examples include a backpack 80 (see FIG. 9). The poles 14 can be retracted and stored with the suit at one or more of these locations without encumbering the user.

The suit interface may be configured to removably attach to connection components on the suit 10. For example, as shown in FIG. 1, the suit 10 includes a connection component 60 at the arm portion 70, a connection component 62 at the waist area 72 and/or a connection component 64 and the leg portion 74. Examples of connection components include a clasp 42 and a magnetic attachment device 44 shown in FIG. 5. In another example, shown in FIG. 9, a connection component 82 is included on the backpack 80.

Figure 3:
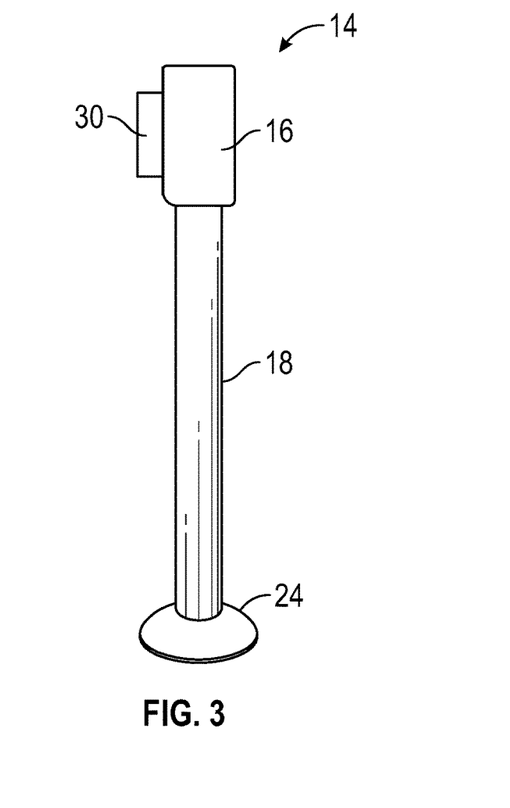
FIG. 3 depicts an embodiment of a pole of a support system for a user of an atmospheric suit, the pole in a retracted position, the pole including an attachment device or grabbable device configured to removably attach the pole to the atmospheric suit.
Figure 4:
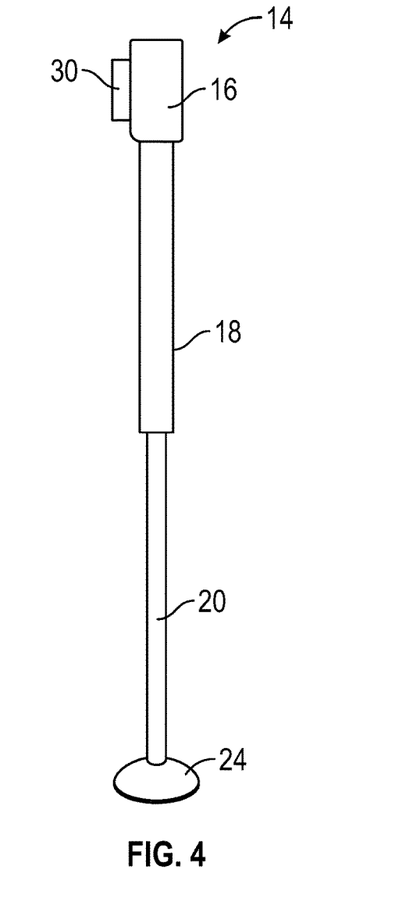
FIG. 4 depicts the pole of FIG. 3 in an extended position.

FIGS. 3 and 4 depict an embodiment of a pole 14 in a retracted position and an extended position, respectively. The pole 14 includes a suit interface 30, which is disposed at or proximate to the handle 16, and provides a removable connection to a glove or arm of the atmospheric suit 10. The suit interface 30 can be used to facilitate the user grasping the pole 14 (e.g., via the strap 40 of FIG. 5), or can be used in a hands-free manner while providing support.

According to exemplary embodiments, the suit interface 30 may be configured to allow attachment to multiple locations of the atmospheric suit 10. For example, the suit interface 30 is removably attachable at various locations of the suit (shown in FIG. 1), for example, to store the pole 14 (e.g., in a retracted position) on the suit 10. The suit interface 30 may be configured to engage with pre-existing features of the suit 10, such as the belt 76, or engage with one or more of the connection components 60, 62 and 64.

Figure 5:
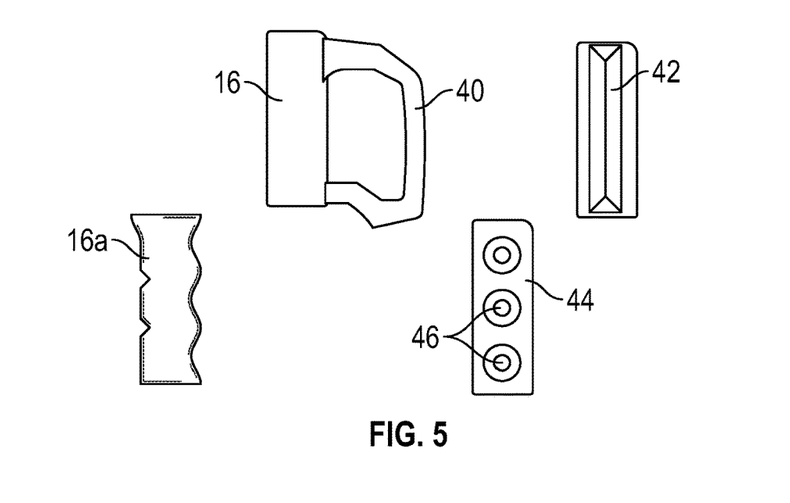
FIG. 5 depicts examples of the attachment device of FIGS. 3 and 4.
Figure 8:
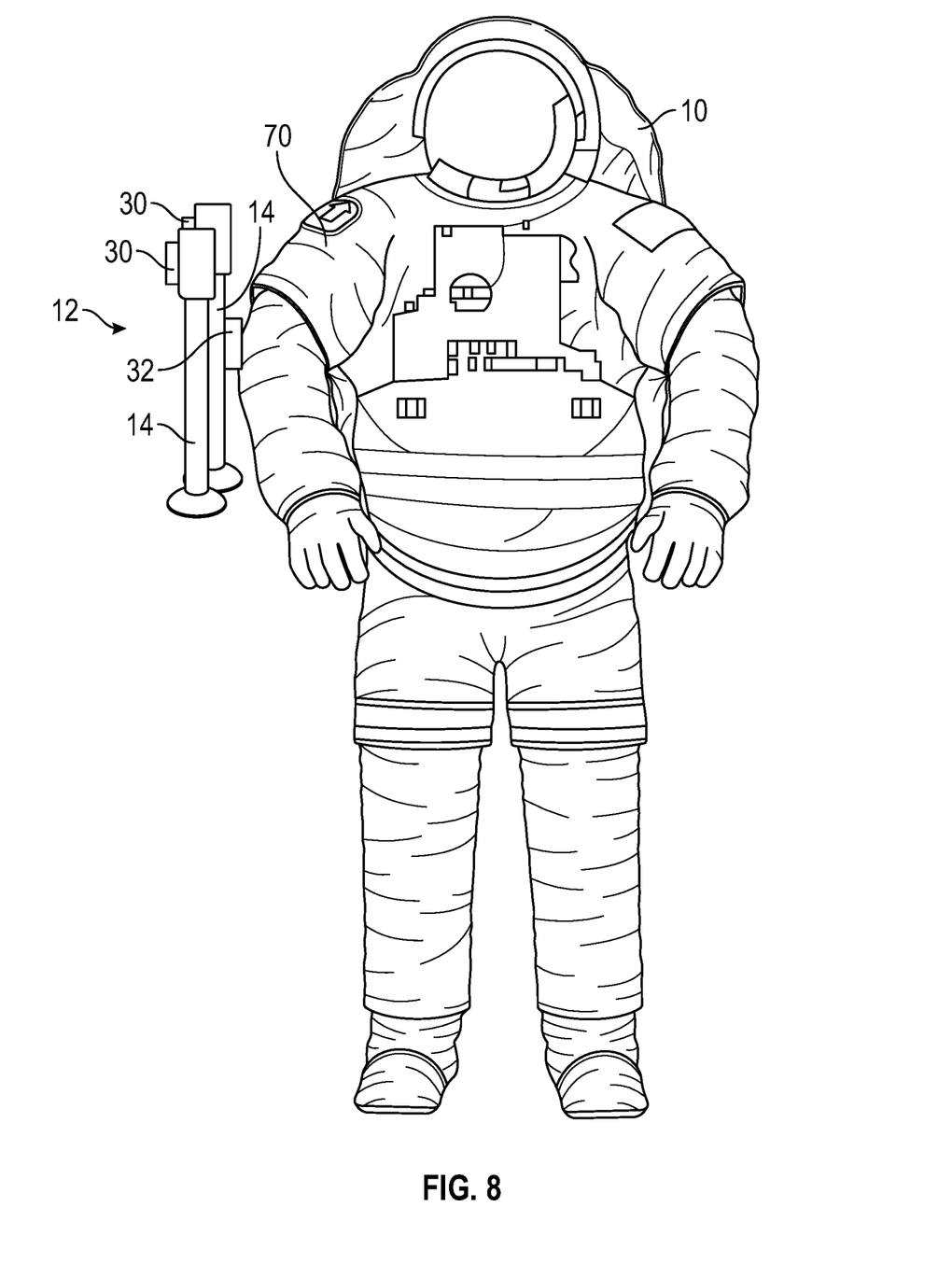
FIG. 8 depicts a user in an atmospheric suit, and depicts the pole of FIG. 7 removably attached to the atmospheric suit.

FIG. 5 shows examples of components that may form all or part of the suit interface 30 or engage with the suit interface 30 according to one or more embodiments. FIG. 5 depicts an example of the handle 16 with a handle strap 40 and a handle 16a configured as an ergonomic handle. The handles 16, 16a may form the suit interface or be attached to the suit interface 30 to allow the user to grasp the pole 14. FIG. 5 also shows a clasp 42 and a magnetic attachment device 44 including an array of magnets 46, either of which may be attached to the handle 16, 16a or to another part of the pole 14 for hands-free attachment, as further discussed with reference to FIGS. 6 and. 8.

Figure 6:
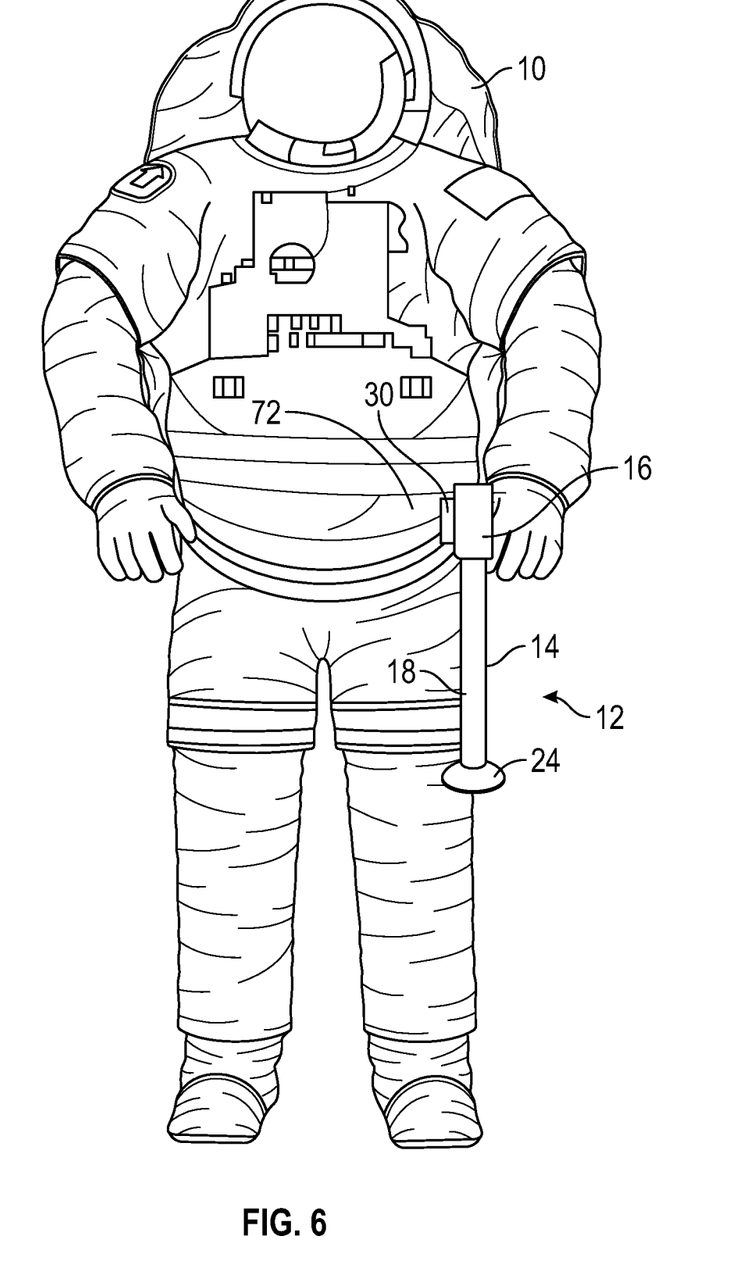
FIG. 6 depicts a user in an atmospheric suit, and depicts the pole of FIGS. 3 and 4 removably attached to the atmospheric suit.

FIG. 6 shows an example of the support system 12 as removably attached to the atmospheric suit 10. A pole 14 is removably attached, for example, to a belt (e.g., via a clasp 42 or strap 40) or removably attached via a magnetic attachment device 44 to the suit 10. The pole 14 can be removably attached to the waist area 72 of the suit 10, or at any other desired location. Although only one pole 14 is shown, a second pole 14 may also be removably attached, either at a different location or the same location (e.g., if the poles 14 are folded or attached together).

Figure 7:
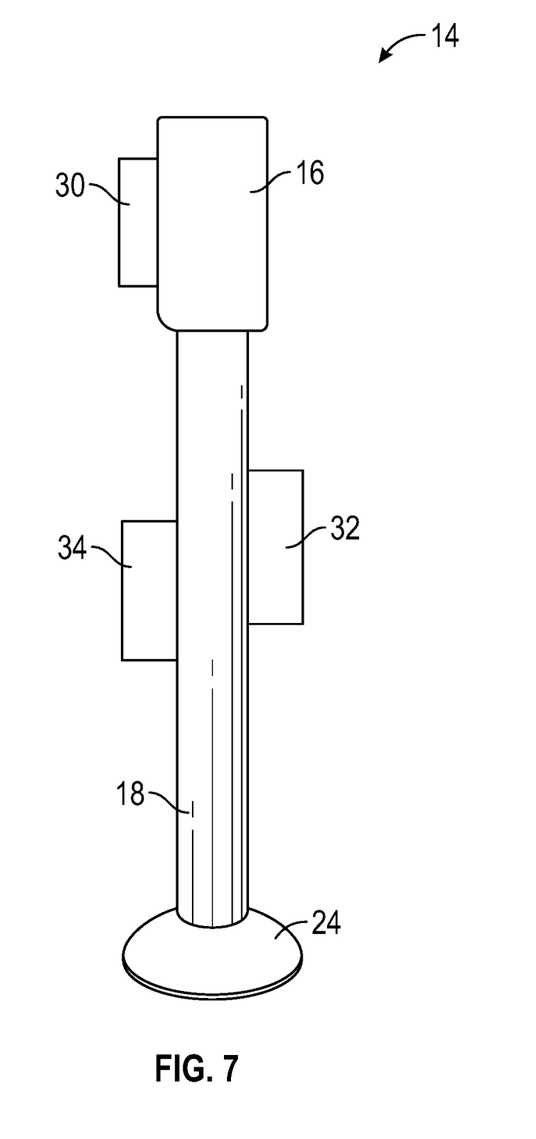
FIG. 7 depicts an embodiment of a pole of a support system for a user of an atmospheric suit, the pole in a retracted position, the pole including a first attachment device and a second attachment device.

FIG. 7 depicts an embodiment of a pole 14 in a retracted position, and depicts additional features that may optionally be included in or used with the pole 14. In this embodiment, the pole 14 includes a second suit interface 32 and a pole attachment 34. It is noted that the pole 14 may include both the second suit interface 32 and the pole attachment 34, or include only one of the interface 32 and the pole attachment 34.

The pole attachment 34 allows the user to removably attach the poles 14 together, so that the poles can be conveniently stored together. Examples of pole attachments 34 include straps, snap-on devices, magnetic devices, clamps and others.

The second suit interface 32 may include an attachment device such as the attachment devices described above. The second suit interface 32 may be configured to be removably attached to a different location than that of the first suit interface 30.

For example, the first suit interface 30 is at or proximate to the handle 16, and provides a removable connection to a glove or arm of the suit 10. Thus, the suit interface 30 can be used to facilitate the user grasping the pole, or can be used in a hands-free manner while providing support. The second suit interface 32 may be configured to allow attachment to any desired suit location, such as an arm or shoulder of the suit or a leg of the suit. The second suit interface 32 may be used, for example, to store the pole 14 in a retracted position on the suit 10.

FIG. 8 shows an example of the support structure as removably attached to the atmospheric suit when the poles 14 are retracted. The poles 14 are connected together via the pole attachment 34 (not shown), and the set of poles 14 are together attached to the atmospheric suit 10 via the second suit interface 32, for example, at the arm portion 70. In an embodiment, only one of the poles 14 has the second suit interface 32, although both poles 14 can have the interface.

Figure 9:
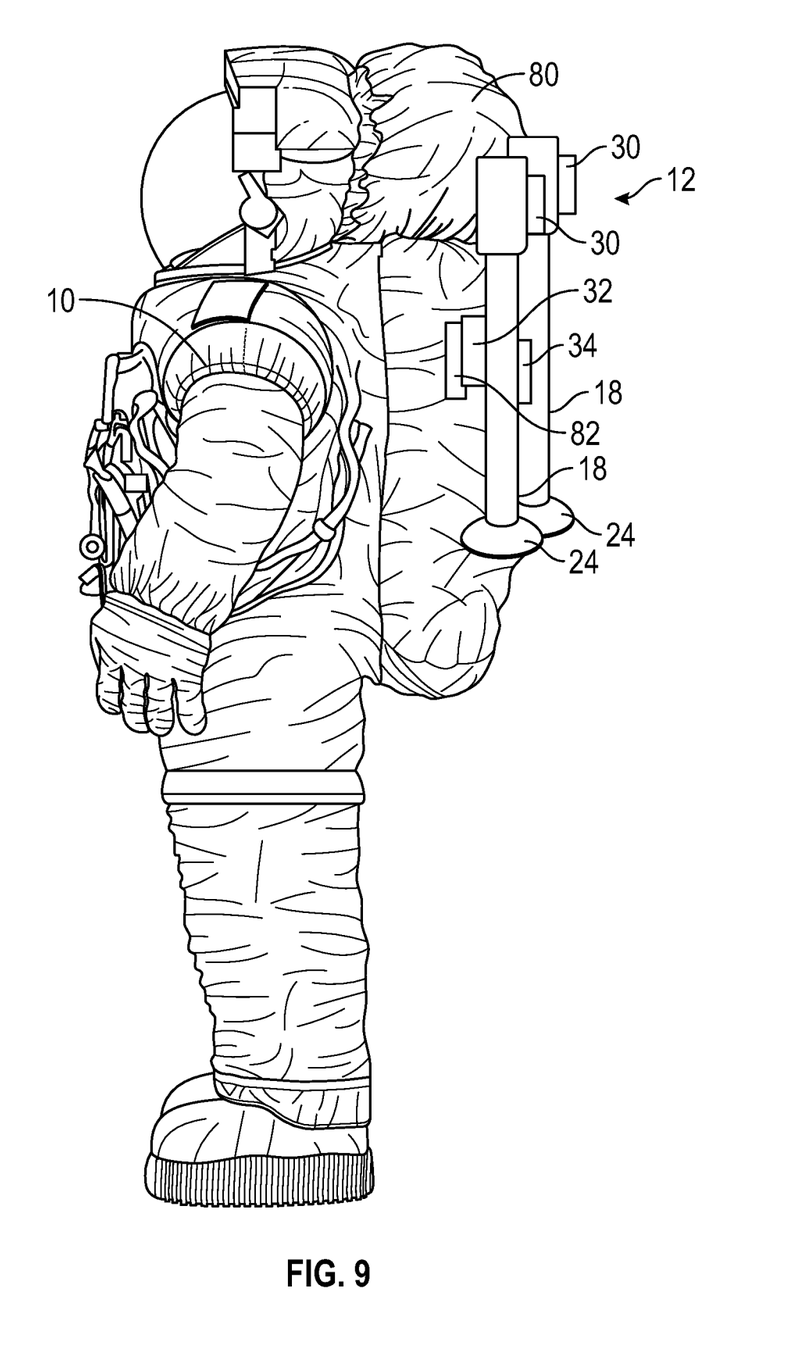
FIG. 9 depicts a user in an atmospheric suit, and depicts the pole of FIG. 7 removably attached to the atmospheric suit.

FIG. 9 shows another example of the support structure as removably attached to a backpack 80. The backpack 80 may be a life support system, such as a primary life support system (PLSS). In this example, the poles 14 are connected in the retracted position by the pole attachment 34, and the set of poles 14 is removably attached to the backpack 80 by a connection component 82.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for support of a user, comprising:
an atmospheric suit including a removable support structure, the support structure including a set of poles configured to be engaged with the atmospheric suit in a space environment, wherein each pole of the set of poles includes an attachment device, the attachment device configured to removably attach the pole to the atmospheric suit at a plurality of locations on the atmospheric suit.

2. The system of claim 1, wherein the plurality of locations includes a first location at one of a glove portion and an arm portion of the atmospheric suit, and a second location that is different than the first location.

3. The system of claim 2, wherein the set of poles are configured to provide support to the user, and the attachment device permits the user to control each pole, when each pole is attached to the atmospheric suit at the first location.

4. The system of claim 2, wherein the attachment device is configured to permit unobstructed movement of the atmospheric suit when each pole is attached to the atmospheric suit at the second location.

5. The system of claim 1, wherein the attachment device includes an attachment mechanism, the attachment mechanism is a handle strap, a mechanical attachment mechanism, a snap-on attachment mechanism, a clasp or a magnetic attachment mechanism.

6. The system of claim 5, wherein the attachment device is disposed at a location of the pole proximate to a handle of the pole.

7. The system of claim 1, wherein each pole is extendable and retractable between a plurality of positions, the plurality of positions including an extended position and a retracted position.

8. The system of claim 1, wherein at least one pole of the set of poles includes a pole attachment configured to removably attach the set of poles together.

9. The system of claim 1, wherein each pole of the set of poles includes a ground interface at an end of each pole.

10. The system of claim 9, further comprising a plurality of interchangeable ground interface attachments, each ground interface attachment removably attachable to the ground interface.

11. The system of claim 1, wherein the attachment device is a first attachment device included in each pole of the set of poles, the first attachment device configured to be removably attached to first location at one of a glove portion and an arm portion of the atmospheric suit, and at least one pole of the set of poles includes a second attachment device configured to removably attach the pole to the atmospheric suit at a second location that is different than the first location.

12. The system of claim 11, wherein each pole is extendable and retractable between a plurality of positions, the plurality of positions including an extended position and a retracted position.

13. The system of claim 12, wherein the first attachment device is configured to be removably attached to the first location when each pole is in the extended position, and the second attachment device is configured to be removably attached at the second location when each pole is in the retracted position.

14. A method of supporting a user in an atmospheric suit, comprising:
engaging a set of poles with the atmospheric suit in a space environment, wherein each pole of the set of poles includes an attachment device, the attachment device configured to removably attach the pole to the atmospheric suit at a plurality of locations on the atmospheric suit.

15. The method of claim 14, wherein the plurality of locations includes a first location at one of a glove portion and an arm portion of the atmospheric suit, and a second location that is different than the first location.

16. The method of claim 14, wherein engaging the set of poles includes removably attaching each pole at the first location, providing support to the user by the set of poles, and permitting the user to control each pole.

17. The method of claim 14, wherein engaging the set of poles includes removably attaching the set of poles at the second location to permit unobstructed movement of the atmospheric suit.

18. The method of claim 14, wherein the attachment device includes an attachment mechanism selected from at least one of: a handle strap, a mechanical attachment mechanism, a snap-on attachment mechanism, a clasp and a magnetic attachment mechanism.

19. The method of claim 14, wherein each pole is extendable and retractable between a plurality of positions, the plurality of positions including an extended position and a retracted position.

20. The method of claim 14, wherein at least one pole of the set of poles includes a pole attachment configured to removably attach the set of poles together.

\* \* \* \* \*